(12) United States Patent
Zhao et al.

(10) Patent No.: US 7,924,905 B2
(45) Date of Patent: Apr. 12, 2011

(54) WIRELESS COMMUNICATION APPARATUS AND METHOD THEREOF

(75) Inventors: Zheng Zhao, Beijing (CN); Jifeng Li, Yokohama (JP)

(73) Assignee: Panasonic Corporation, Osaka (JP)

( * ) Notice: Subject to any disclaimer, the term of this patent is extended or adjusted under 35 U.S.C. 154(b) by 536 days.

(21) Appl. No.: 12/088,662

(22) PCT Filed: Sep. 29, 2006

(86) PCT No.: PCT/JP2006/319554
§ 371 (c)(1),
(2), (4) Date: Mar. 28, 2008

(87) PCT Pub. No.: WO2007/037416
PCT Pub. Date: Apr. 5, 2007

(65) Prior Publication Data
US 2010/0150210 A1     Jun. 17, 2010

(30) Foreign Application Priority Data

Sep. 30, 2005   (CN) ............................ 200510108559

(51) Int. Cl.
*H04B 1/00*      (2006.01)
*H04L 27/00*     (2006.01)
(52) U.S. Cl. ...................................... 375/141; 375/299
(58) Field of Classification Search .................. 375/141, 375/130, 135, 146, 147, 148, 299, 346, 347, 375/348, 260; 455/125; 370/328, 329, 342, 370/352
See application file for complete search history.

(56) References Cited

U.S. PATENT DOCUMENTS
6,219,341 B1    4/2001  Varanasi
(Continued)

FOREIGN PATENT DOCUMENTS
JP    2002-232938 A    8/2002
(Continued)

OTHER PUBLICATIONS

"Further Results on Multi-Paths Diversity for MIMO (MPD)," Discussion Document for TSG-RAN Working Group 1 Meeting #34, Nortel Networks, R1-031102, Seoul, Oct. 6-11, 2003, pp. 1-4.

(Continued)

*Primary Examiner* — Khai Tran
(74) *Attorney, Agent, or Firm* — Seed IP Law Group PLLC (57) ABSTRACT

A wireless communication apparatus in a closed loop communication wherein a channel resource can be shared among users and hence the capacity of the communication system can be increased. In this apparatus, calculating parts (6031 and 6032) calculate a first pre-code ($\alpha$) and a second pre-code ($\beta$), respectively, from CSI fed back from a receiving wireless communication apparatus; an encoding part (6033) includes multipliers ($\alpha 1$, $\alpha 2$), which multiply the first pre-code ($\alpha$) by a first data and a second data to generate a first encoded data and a third encoded data, respectively, and also includes multipliers ($\beta 1$, $\beta 2$) that multiply the second pre-code ($\beta$) by the first data and the second data to generate a second encoded data and a fourth encoded data, respectively; spreading parts (6034-1 and 6034-2) spread the first and second encoded data with a first spreading code (c) to generate a first spread data and a second spread data, respectively; spreading parts (6035-1 and 6035-2) spread the third and fourth encoded data with a second spreading code (p) to generate a third spread data and a fourth spread data, respectively; an adding part (6036) adds the first spread data and the third spread data together; and an adding part (6037) adds the second spread data and the fourth spread data together.

8 Claims, 10 Drawing Sheets

U.S. PATENT DOCUMENTS

| | | | |
|---|---|---|---|
| 6,834,109 | B1 | 12/2004 | Pare, Jr. |
| 2006/0178121 | A1* | 8/2006 | Hamalainen et al. ......... 455/125 |
| 2007/0280336 | A1* | 12/2007 | Zhang et al. ................. 375/148 |

FOREIGN PATENT DOCUMENTS

| | | |
|---|---|---|
| JP | 2005-509360 A | 4/2005 |
| JP | 2005-124158 A | 5/2005 |
| JP | 2005-523639 A | 8/2005 |

OTHER PUBLICATIONS

"Multi-Paths Diversity for MIMO (MPD)," Discussion Document for TSG-RAN Working Group 1 Meeting #32, Nortel Networks, R1-030565, Marne La Vallée, France, May 19-23, 2003, pp. 1-5.

"Multi-Paths Diversity for MIMO (MPD)," Discussion Document for TSG-RAN Working Group 1 Meeting #33, Nortel Networks, R1-030760, New York, Aug. 25-29, 2003, pp. 1-6.

"Rate Control for MPD," Discussion Document for TSG-RAN Working Group 1 Meeting #35, Nortel Networks, R1-031316, Lisbon, Portugal, Nov. 17-21, 2003, pp. 1-4.

Zhang, H., et al., "A Tracking Approach for Precoded MIMO-OFDM Systems With Low Data Rate CSI Feedback," Proceedings of the IEEE 16th International Symposium on Personal, Indoor and Mobile Radio Communications, Berlin, Sep. 11-14, 2005, pp. 241-245.

* cited by examiner

WIRELESS COMMUNICATION APPARATUS AND METHOD THEREOF

TECHNICAL FIELD

The present invention relates to a wireless communication apparatus and wireless communication method. More particularly, the present invention relates to a wireless communication apparatus and wireless communication method used in a closed-loop MIMO (Multi Input Multi Output) communication system.

BACKGROUND ART

Figure 1:
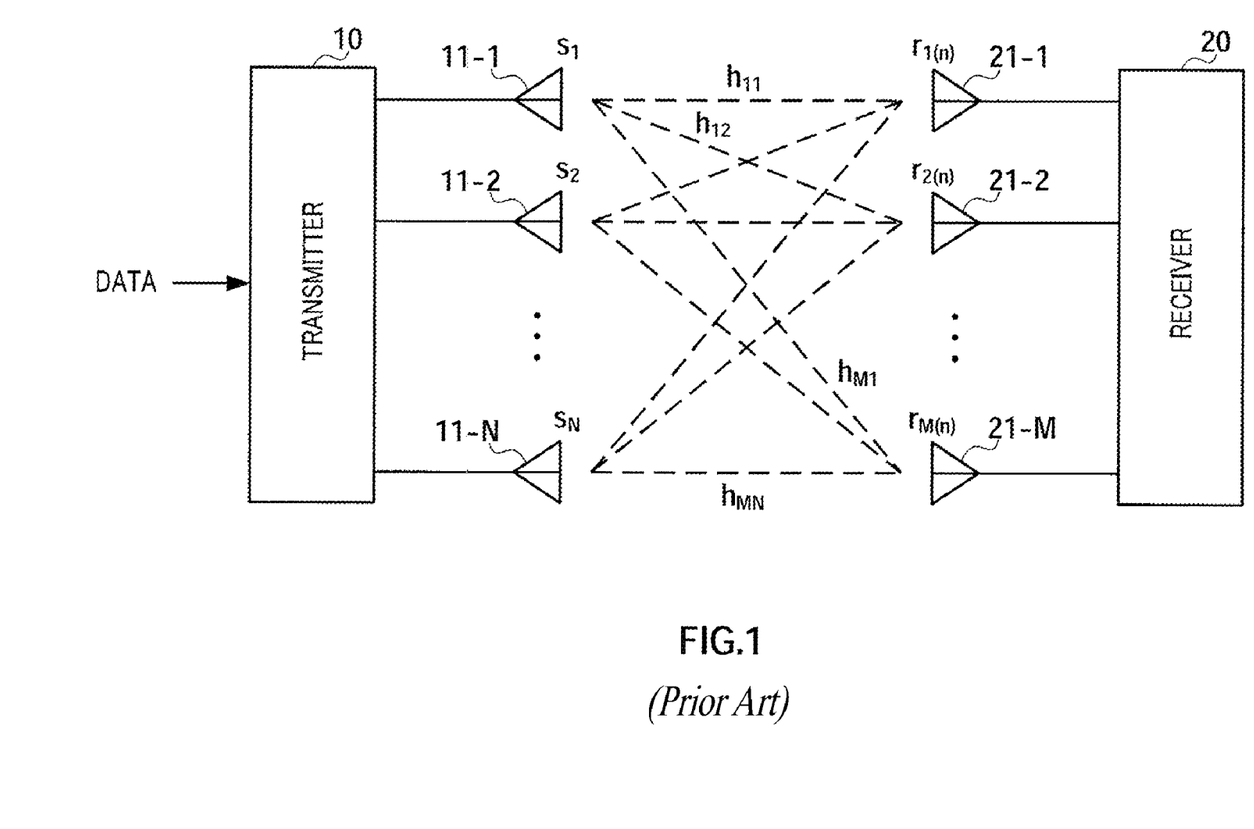
FIG. 1 shows a configuration of a conventional MIMO communication system.

The space multiplexing MIMO communication system transmits signals using multiple antennas of the receiving side and the transmitting side, and provides a feature of high throughput. FIG. 1 shows a configuration of the conventional MIMO communication system. As shown in FIG. 1, in the space multiplexing MIMO communication system, transmitter 10 transmits different symbol sequences $s_1, s_2 \ldots, s_N$ through transmitting antennas 11-1 to 11-N, respectively, at the same time, in the same symbol period, and receiver 20 receives the signals using receiving antennas 21-1 to 21-M. Channel fading between transmitting antennas 11-1 to 11-N and receiving antennas 21-1 to 21-M is $h_{11}, h_{12}, \ldots, h_{MN}$, respectively. Receiver 20 detects signals $r_1(n), r_2(n), \ldots, r_M(n)$ received at the same time, by utilizing the feature that channel fading from one transmitting antenna is not influenced by channel fading from the other.

For example, there is a technique of demultiplexing a plurality of signals transmitted at the same time through processing in chip units by utilizing one receiving antenna at the receiving side in an open-loop MIMO communication system (see Non-Patent Documents 1, 2, 3 and 4). The technique will be described below.

Figure 2:
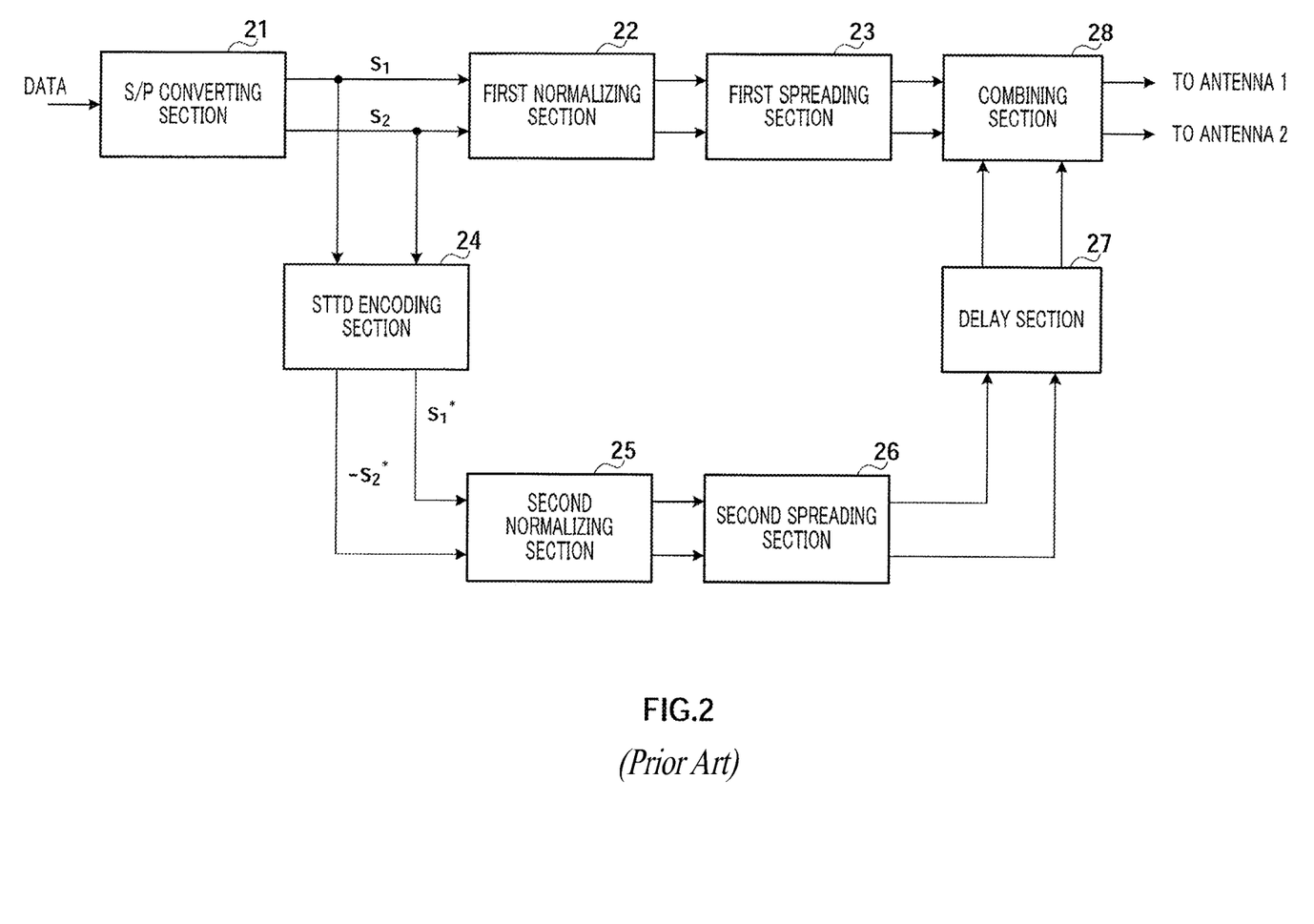
FIG. 2 shows a configuration of the transmitting side of a conventional MIMO communication system employing an MPD method.

FIG. 2 shows a configuration of the transmitting side of a conventional MIMO communication system employing the MPD (Multi Path Diversity) method.

First, serial/parallel (S/P) converting section 21 converts data inputted in serial into parallel data, to obtain first symbol stream $s_1$ and second symbol stream $s_2$. First symbol stream $s_1$ is outputted to first normalizing section 22 and STTD (Space Time Transmit Diversity) encoding section 24. In the same way, second symbol stream $s_2$ is outputted to first normalizing section 22 and STTD encoding section 24.

First normalizing section 22 normalizes the two inputted symbol streams. For example, first normalizing section 22 normalizes symbols of the first symbol stream and second symbol stream by multiplying the first symbol stream and second symbol stream by a constant $1/\sqrt{2}$, such that the power of the symbols to be transmitted is 1, and outputs normalized symbol streams $s_1$ and $s_2$ to first spreading section 23.

First spreading section 23 spreads the inputted symbol streams. For example, first spreading section 23 multiplies the symbols by a specific spreading code to generate a first spreading sequence and second spreading sequence, and outputs the sequences to combining section 28.

On the other hand, STTD encoding section 24 performs the processing represented by following equation 1 on two inputted symbol streams $s_1$ and $s_2$, and outputs the results $-s_2^*$ and $s_1^*$ to second normalizing section 25.

(Equation 1)

$$\begin{pmatrix} s_1 \\ s_2 \end{pmatrix} \Rightarrow \begin{pmatrix} -s_2^* \\ s_1^* \end{pmatrix} \quad [1]$$

Second normalizing section 25 performs normalizing processing of multiplying inputted $-s_2^*$ and $s_1^*$ by a constant $1/\sqrt{2}$, for example, and outputs the result to second spreading section 26.

Second spreading section 26 performs spreading processing of multiplying the normalized symbol streams by a specific spreading code to generate a first spreading sequence and a second spreading sequence, and outputs the sequences to delay section 27.

Delay section 27 delays the first spreading sequence and the second spreading sequence by one chip, and outputs the delayed sequences to combining section 28.

Combining section 28 adds the first spreading sequence and second spreading sequence inputted from first spreading section 23 to the first spreading sequence and second spreading sequence inputted from delay section 27, and transmits the results from the respective two antennas.

The MIMO communication system employing the MPD method uses delay diversity of chip units, and so loses orthogonality of the spreading codes. Therefore, the interference signal of another communication terminal user (hereinafter simply "user") remains in the despread signal, and so deteriorates the signal to interference noise ratio (SINR) of the despread signal. Further, also in flat fading, intersymbol interference is caused in the despread signal by the influence of delay. Therefore, with the MPD method, it is necessary to perform processing of canceling interference at the receiving side.

Figure 3:
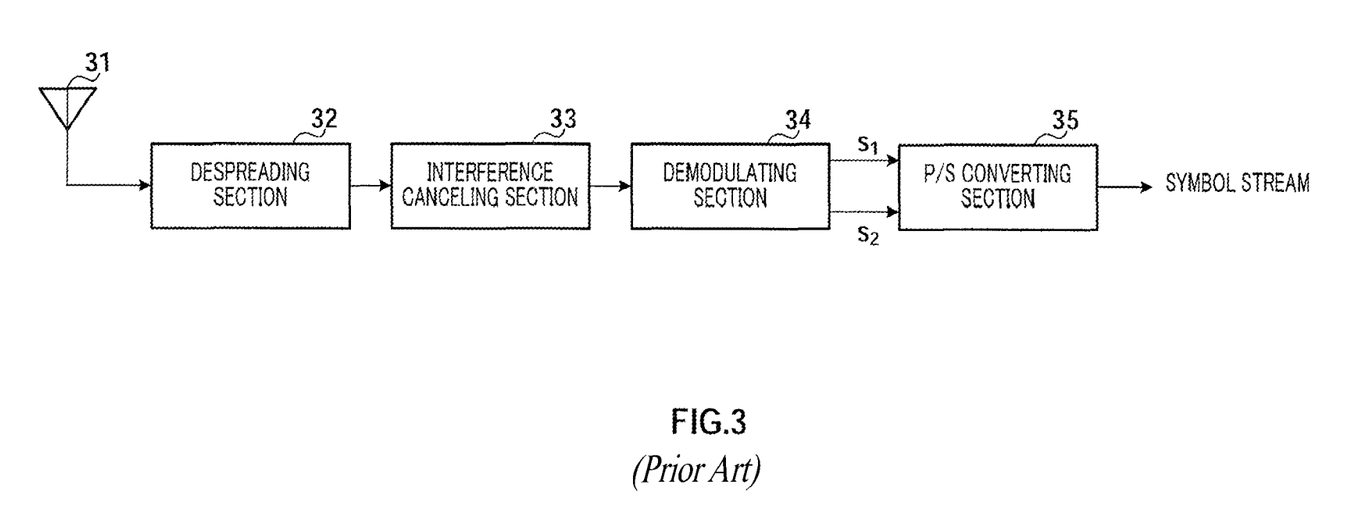
FIG. 3 shows a configuration of the receiving side of the conventional MIMO communication system employing the MPD method.

FIG. 3 shows a configuration of the receiving side of the conventional MIMO communication system employing the MPD method.

Despreading section 32 performs despreading processing of calculating the inner product of spreading code vector and the chip vector of the received signal on the received signal inputted through antenna 31.

Interference canceling section 33 cancels interference between users and intersymbol interference in the despread signal, and outputs the result to demodulating section 34.

Demodulating section 34 demodulates the inputted signal into first symbol streams and second symbol stream $s_2$ using, for example, the minimum mean square error (MMSE) method.

Parallel/serial (P/S) converting section 35 converts the first symbol stream $s_1$ and second symbol stream $s_2$ inputted in parallel into serial streams, restores the original symbol streams and outputs the results.

As described above, in a MIMO communication system employing the MPD method, transmission diversity is realized by delay multiplexing.

Further, a MIMO communication system employing an STTD spreading method, which is an improved version of the MPD method, has also been proposed. By determining the space-time transmission order in chip units, the STTD spreading method makes it possible to ensure orthogonality of the transmission data in chip units and reduce intersymbol interference and interference between users due to delay of chip units at the receiving side. With the STTD spreading method, the spreading codes are orthogonal to each other, so that it is possible to substantially reduce complexity of detection. Like the MPD method, the MIMO communication system employing the STTD spreading method enables transmission diversity and space division multiplexing.

Non-Patent Document 1: "Multi-paths diversity for MIMO (MPD)", 3GPP TSG RAN WG1, R1-030565, Marne La Vallée, France, May $19^{th}$-$23^{rd}$, 2003

Non-Patent Document 2: "Multi-paths diversity for MIMO (MPD)", 3GPP TSG RAN WG1, NY, R1-030760, New York, USA, August $25^{th}$-$29^{th}$, 2003

Non-Patent Document 3: "Further results on Multi-Paths Diversity for MIMO (MPD)", 3GPP TSG RAN WG1, NY, R1-031102, Seoul, South Korea, Oct. $6^{th}$-$11^{th}$, 2003

Non-Patent Document 4: "Rate Control for MPD", 3GPP TSG RAN WG1, NY, R1-031316, Lisbon, Portugal, Nov. $17^{th}$-$21^{st}$, 2003

DISCLOSURE OF INVENTION

Problems to be Solved by the Invention

However, with the above-described MPD method, the receiving side needs to perform processing of canceling interference, and so there is a problem of making the processing at the receiving side complicated. Further, the MPD method and the STTD spreading method are both directed to open-loop communication. By contrast with this, the present invention is directed to a wireless communication apparatus and wireless communication method in closed-loop communication.

It is therefore an object of the present invention to provide a wireless communication apparatus and wireless communication method in closed-loop communication that make it possible to improve communication system capacity by sharing channel resources between users.

Means for Solving the Problem

The wireless communication apparatus of the present invention is used in a MIMO communication system and adopts a configuration including: a user grouping section that groups a plurality of communication terminal users into a plurality of groups; a calculating section that calculates a plurality of pre-codes from channel quality information fed back from one communication terminal user in one group; an encoding section that encodes a plurality of data of an other communication terminal user in the one group using the plurality of pre-codes respectively to obtain a plurality of encoded data; a spreading section that spreads the plurality of encoded data using a plurality of spreading codes which correspond to the plurality of data respectively, to obtain a plurality of spread data; an adding section that adds up the plurality of spread data for each of the plurality of pre-codes to obtain a plurality of added data; and a transmitting section that transmits the plurality of added data from a plurality of antennas, respectively.

Advantageous Effect of the Invention

According to the present invention, channel resources can be shared between users taking into consideration a plurality of single antenna users collectively, so that it is possible to increase system capacity. Further, by utilizing the feature of the closed-loop system, data is spread using a plurality of spreading codes, added to each other, and transmitted from a plurality of antennas, so that it is possible to realize transmission diversity and a wireless communication apparatus that is robust against space selective fading, without decreasing system throughput. Further, the transmitting side performs complicated calculations such as simultaneous equations, so that the receiving side can reduce the complexity of processing.

BEST MODE FOR CARRYING OUT THE INVENTION

An embodiment of the present invention will be described in detail below with reference to the accompanying drawings. For ease of explanation of the present invention, unnecessary detailed configurations and functions will be omitted. Further, for ease of explanation, in this embodiment, the number of transmitting antennas is assumed to be two, and the number of receiving antennas is assumed to be one.

Generally, when two symbols are transmitted in one period to improve the transmission rate of the system, the receiving side requires two or more equations to decode the two symbols. Even in the case of flat fading, to obtain two or more equations, the receiving side needs to provide two or more diversity branches. On the other hand, when data is spread, if two spreading codes are distributed to one user, the receiving side can decode two symbols transmitted at the same time utilizing the feature that the two spreading codes are orthogonal to each other. However, when two spreading codes are distributed to one user, the number of users that can communicate simultaneously decreases by half.

Figure 4:
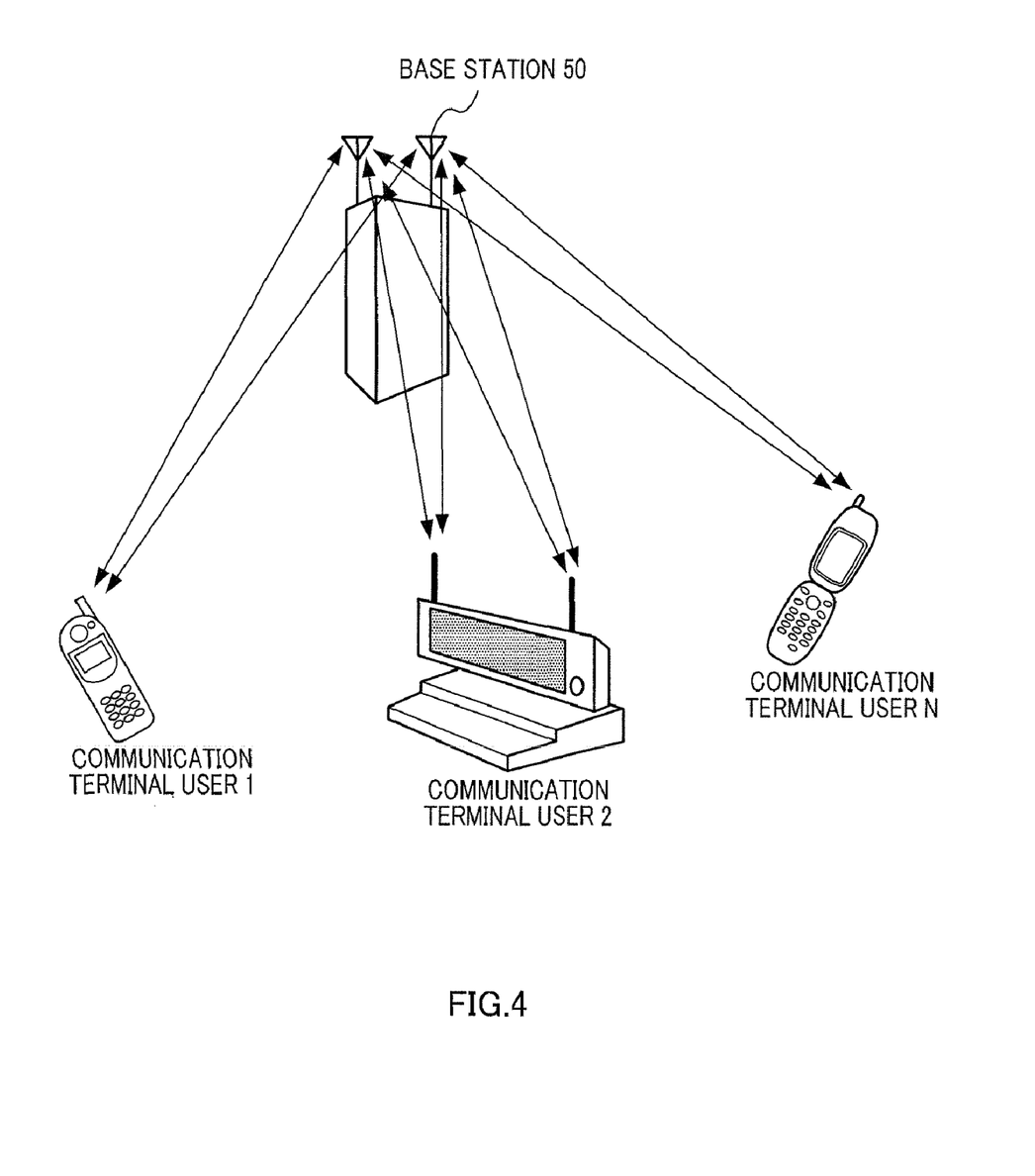
FIG. 4 shows a configuration of a multi-user MIMO communication system according to an embodiment of the present invention.

FIG. 4 shows the configuration of the multi-user MIMO communication system according to the embodiment of the present invention. As shown in FIG. 4, with the present invention, by utilizing the feature that space channels are separated between users because space positions of N users are different, different N equations from each other are obtained in the whole system taking into consideration a plurality of users at the receiving side collectively. Diversity is realized by utilizing the features of the closed-loop system and using N simultaneous equations at the transmitting side (base station 50) based on CSI (Channel State Information) fed back from the users. Further, by grouping a plurality of users into groups of two users, and spreading data of the two users in one group using two spreading codes, the number of users that can communicate simultaneously is maintained.

Figure 5:
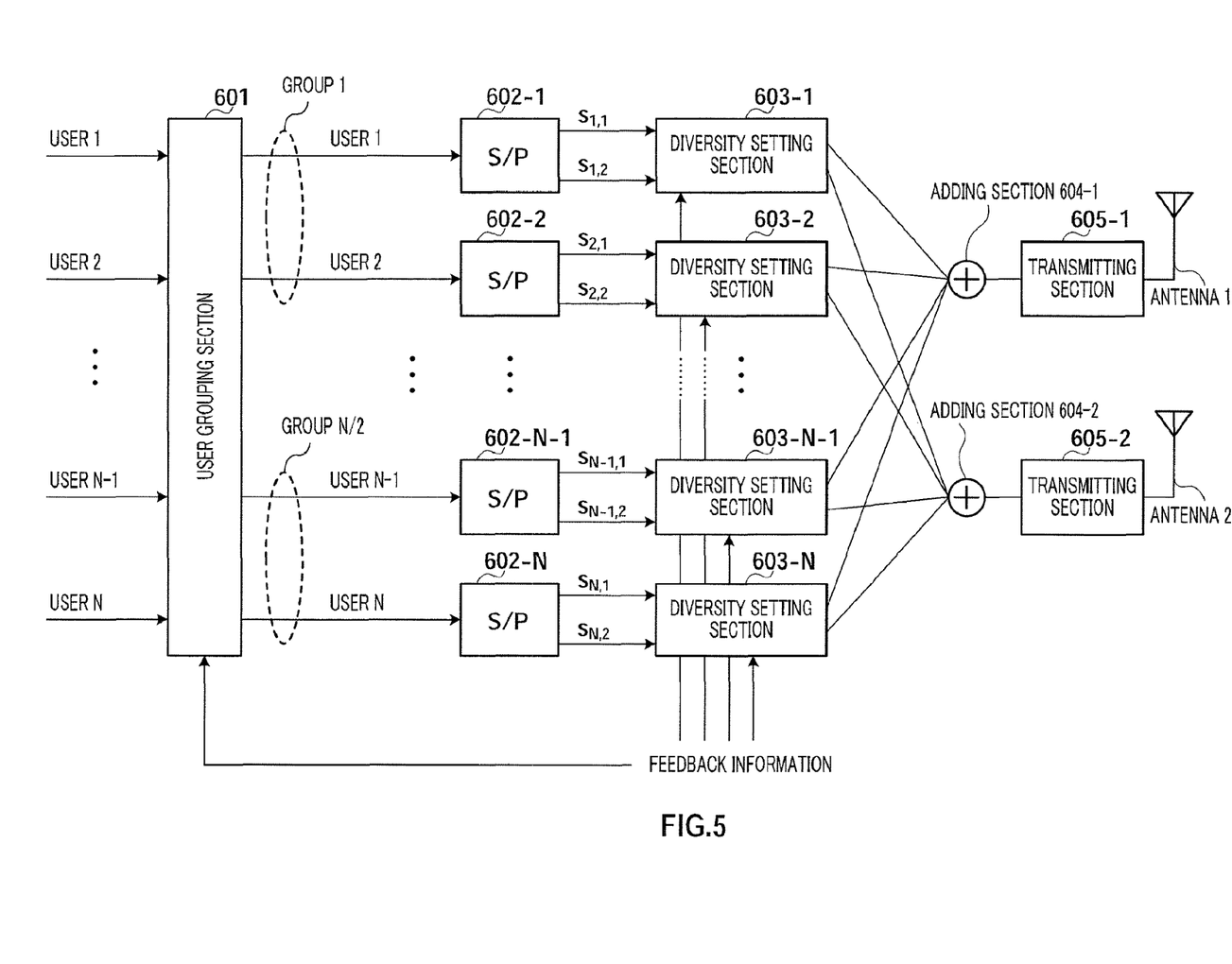
FIG. 5 shows a configuration of a wireless communication apparatus at the transmitting side according to the embodiment of the present invention.

FIG. 5 shows the configuration of the wireless communication apparatus at the transmitting side according to the embodiment of the present invention.

In the wireless communication apparatus shown in FIG. 5, user grouping section 601 groups a plurality of users 1 to N into a plurality of groups 1 to N/2. To be more specific, the number of users per group is determined based on the number of antennas and diversity gain, correlation between users is calculated for every two users, and users having the lowest correlation are grouped into one group.

S/P converting sections 602-1 to 602-N each convert serial data into parallel data, that is, convert into first data $s_{2n-1}$ and second data $s_{2n}$, and outputs the results to diversity section 603. In addition, FIG. 5 shows an example where n=1.

Diversity setting sections 603-1 to 603-N each perform pre-encoding and spreading processing on inputted first data $s_{2n-1}$ and second data $s_{2n}$, and output the obtained first transmission data and second transmission data to adding sections 604-1 and 604-2. Details of diversity setting sections 603-1 to 603-N will be described later.

Adding section 604-1 adds up the first transmission data from each user and outputs the obtained first added data to transmitting section 605-1. In the same way, adding section 604-2 adds up the second transmission data from each user and outputs the obtained second added data to transmitting section 605-2.

Transmitting section 605-1 performs radio processing on the first added data inputted, and transmits the result from antenna 1. In the same way, transmitting section 605-2 performs radio processing on the second added data inputted, and outputs the result from antenna 2.

Figure 6:
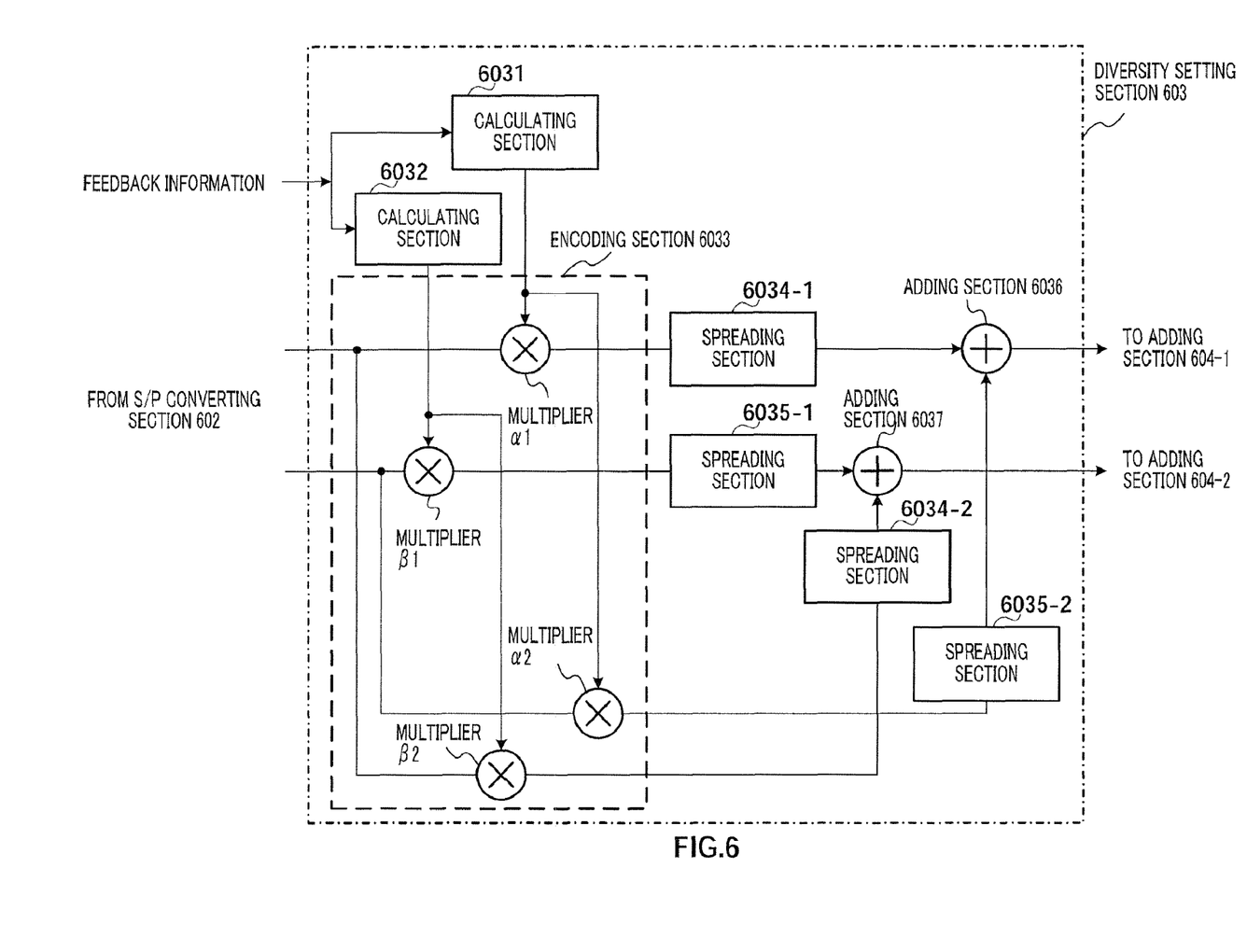
FIG. 6 shows a detailed configuration of a diversity setting section according to the embodiment of the present invention.

Diversity setting section 603 will be described in detail using FIG. 6. FIG. 6 shows a detailed configuration of the diversity setting section according to the embodiment of the present invention. All diversity setting sections 603-1 to 603-N shown in FIG. 5 adopt the configuration shown in FIG. 6. Here, the processing for user K and user L of the same group in the n-th symbol period will be described as an example.

Calculating sections 6031 and 6032 calculate a first pre-code (α) and second pre-code (β), respectively, from CSI, which is channel quality information fed back from the wireless communication apparatus at the receiving side.

Encoding section 6033 is configured with multipliers α1 and α2, and multipliers β1 and β2. Multipliers α1 and α2 encode the first data and the second data by multiplying the first data and second data inputted from S/P converting section 602 by first pre-code α, respectively, to obtain first encoded data where the first data is multiplied by α and third encoded data where the second data is multiplied by α. Multipliers β1 and β2 encode the first data and the second data by multiplying the first data and second data inputted from S/P converting section 602 by second pre-code β, respectively, to obtain second encoded data where the first data is multiplied by β and fourth encoded data where the second data is multiplied by β.

Spreading sections 6034-1 and 6034-2 spread the first encoded data and second encoded data using a first spreading code (c) corresponding to the first data, respectively, to obtain first spread data and second spread data. In the same way, spreading sections 6035-1 and 6035-2 spread the third encoded data and fourth encoded data using a second spreading code (p) corresponding to the second data, respectively, to obtain third spread data and fourth spread data.

Adding section 6036 adds the first spread data and the third spread data, each multiplied by α, and outputs the obtained first transmission data to adding section 604-1. In the same way, adding section 6037 adds the second spread data and the fourth spread data, each multiplied by β, and outputs the obtained second transmission data to adding section 604-2.

To be more specific, diversity setting section 603 for user K receives symbols $s_{k,2n-1}$ and $s_{k,2n}$ subjected to S/P conversion, and CSI fed back from the other user L of the same group as user K. First pre-code $\alpha_k$ and second pre-code $\beta_k$ are calculated from the fed back CSI for user L, first data $s_{k,2n-1}$ is multiplied by calculated $\alpha_k$ and $\beta_k$, and second data $s_{k,2n}$ is multiplied by $\alpha_k$ and $\beta_k$. $s_{k,2n-1}$ multiplied by $\alpha_k$ and $s_{k,2n-1}$ multiplied by $\beta_k$ are spread using spreading code c, and the first spread data and second spread data represented by following equations 2 and 3, are obtained.

[2]

$$\alpha_k s_{k,2n-1} c_1, \alpha_k s_{k,2n-1} c_2, \ldots, \alpha_k s_{k,2n-1} c_N \quad \text{(Equation 2)}$$

[3]

$$\beta_k s_{k,2n-1} c_1, \beta_k s_{k,2n-1} c_2, \ldots, \beta_k s_{k,2n-1} c_N \quad \text{(Equation 3)}$$

On the other hand, $s_{k,2n}$ multiplied by $\alpha_k$ and $s_{k,2n}$ multiplied by $\beta_k$ are spread using spread code p, and the third spread data and fourth spread data represented by following equations 4 and 5 are obtained.

[4]

$$\alpha_k s_{k,2n} p_1, \alpha_k s_{k,2n} p_2, \ldots, \alpha_k s_{k,2n} p_N \quad \text{(Equation 4)}$$

[5]

$$\beta_k s_{k,2n} p_1, \beta_k s_{k,2n} p_2, \ldots, \beta_k s_{k,2n} p_N \quad \text{(Equation 5)}$$

The obtained first spread data and third spread data are added to provide first transmission data. In the same way, the obtained second spread data and fourth spread data are added to provide second transmission data.

Using the same method as described above, user L can obtain first transmission data and second transmission data.

Figure 7:
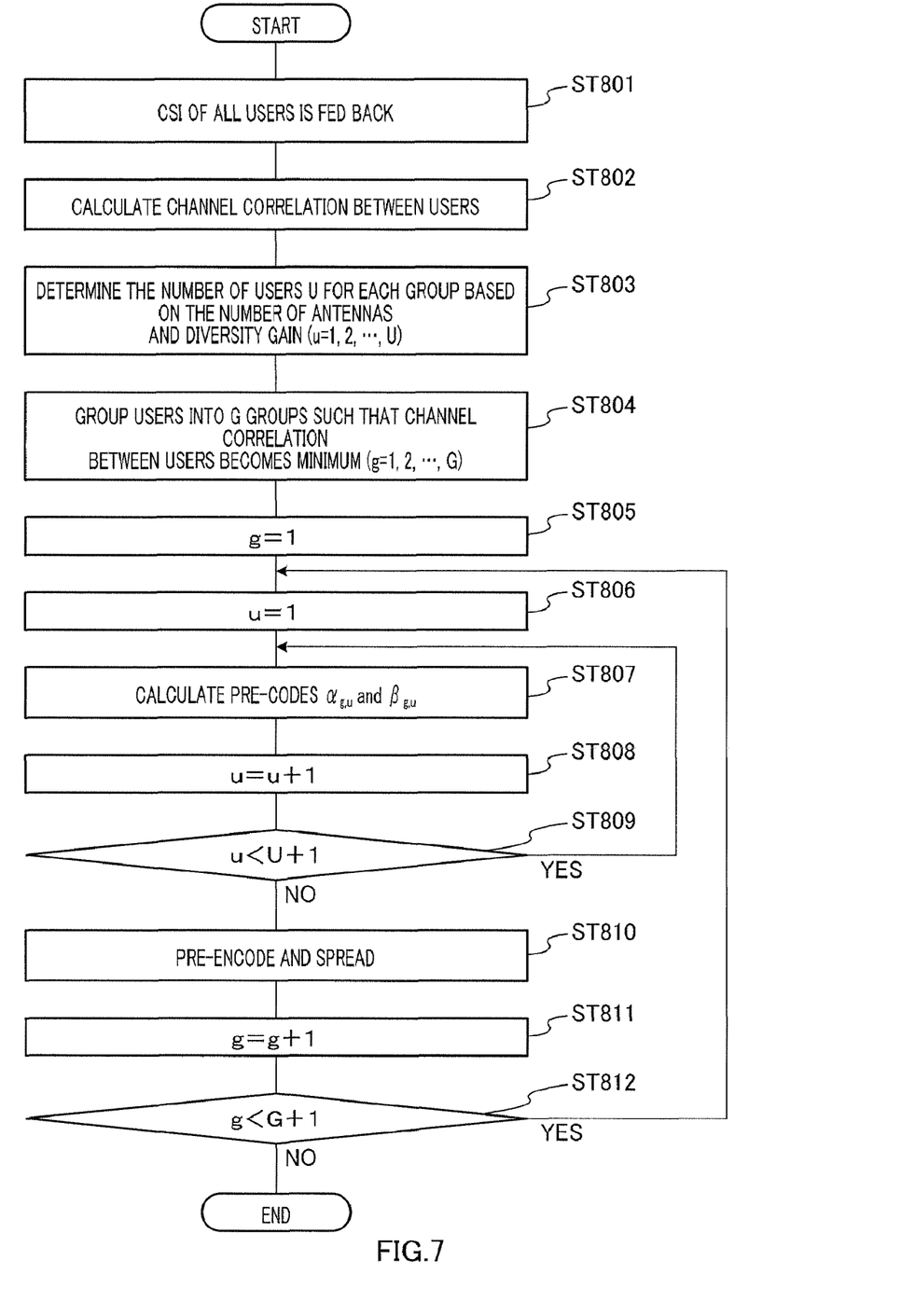
FIG. 7 is a flowchart showing processing of the wireless communication apparatus at the transmitting side according to the embodiment of the present invention.

FIG. 7 is a flowchart showing processing of the wireless communication apparatus at the transmitting side according to the embodiment of the present invention.

In step ST801, CSI for all users is fed back from the receiving side to user grouping section 601 using a feedback channel.

In step ST802, user grouping section 601 calculates inter-channel correlation for every two users based on the fed back CSI.

In step ST803, user grouping section 601 determines the number of users u (where u=1, 2, ..., U) per group from the number of transmitting antennas and diversity gain. In addition, in this embodiment, the number of users per group is assumed to be two.

In step ST804, user grouping section 601 groups users into g groups (where g=1, 2, ..., G) such that channel correlation between users becomes a minimum, based on the correlation calculated in step ST802.

In step ST805, user grouping section 601 selects the group of group number g=1, and, in step ST806, user grouping section 601 determines the user of user number u=1 of the selected group.

In step ST807, diversity setting sections 603-1 to 603-N calculate pre-codes $\alpha_{g,u}$ and $\beta_{g,u}$ for user u by utilizing the fed back CSI for the other user of the same group. For example, according to the ZF (Zero Forcing) method, when the number of transmitting antennas is two and the number of users per group is two, calculated $\alpha_{g,u}$ and $\beta_{g,u}$ become equations 6 and 7. $h_{1,1}$ and $h_{1,2}$ represent channel fading of user u and channel fading of the other user of the same group as user u, respectively.

(Equation 6)

$$\alpha_{g,u} = \frac{h_{l,2}}{\sqrt{h_{l,1}^2 + h_{l,2}^2}} \quad [6]$$

(Equation 7)

$$\beta_{g,u} = \frac{-h_{l,1}}{\sqrt{h_{l,1}^2 + h_{l,2}^2}} \quad [7]$$

In step ST808, diversity setting sections 603-1 to 603-N set u=u+1, and, in step ST809, diversity setting sections 603-1 to 603-N judge whether or not pre-codes for all users in the group are calculated.

When u<U+1 (ST809: "Yes"), the flow return to step ST807, and diversity setting sections 603-1 to 603-N calculate pre-codes of users continuously. On the other hand, when u≧U+1 (ST809: "No"), the flow proceeds to step ST810.

In step ST810, diversity setting sections 603-1 to 603-N pre-encode and spread data in the same group.

In step ST811, diversity setting sections 603-1 to 603-N set g=g+1, and, in step ST812, it is judged whether or not diversity setting sections 603-1 to 603-N complete diversity setting for all groups.

When g<G+1 (ST812: "Yes"), the flow returns to step ST806, and diversity setting sections 603-1 to 603-N perform diversity setting for users continuously. On the other hand, when g≧G+1 (ST812: "No"), processing is finished.

Figure 8:
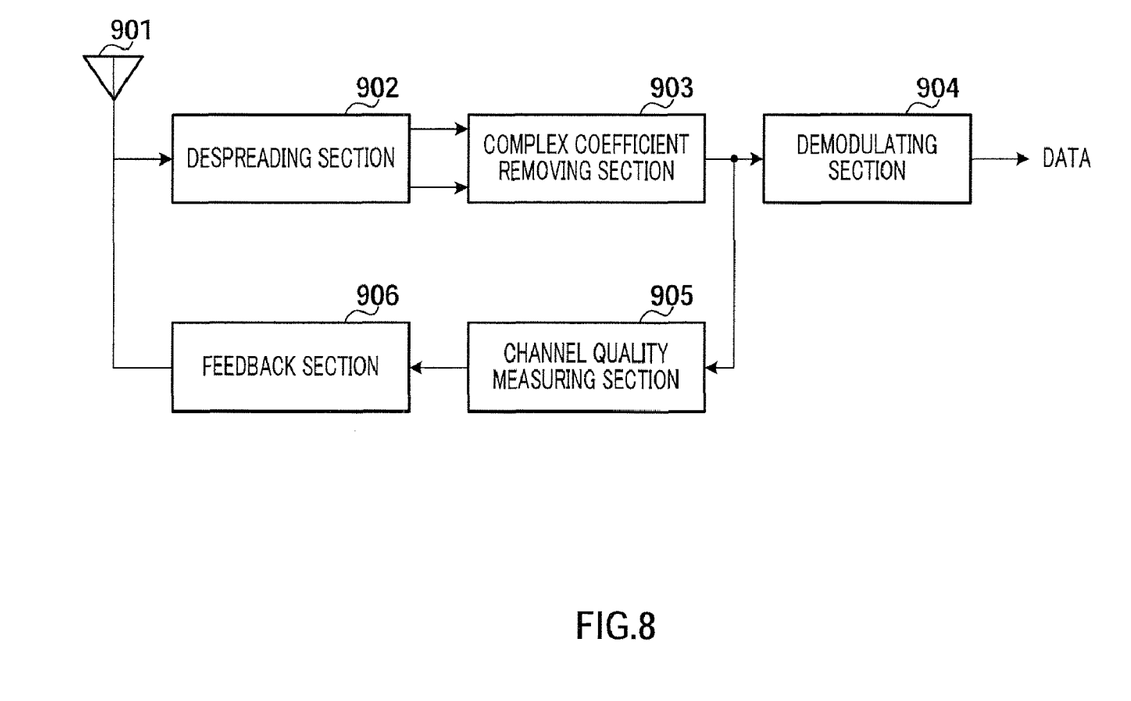
FIG. 8 shows a configuration of a wireless communication apparatus at the receiving side according to the embodiment of the present invention.

FIG. 8 shows the configuration of the wireless communication apparatus at the receiving side according to the embodiment of the present invention.

In the wireless communication apparatus shown in FIG. 8, antenna 901 receives signals and outputs the signals to despreading section 902.

Despreading section 902 despreads the inputted received signals and outputs the results to complex coefficient removing section 903.

Complex coefficient removing section 903 removes the complex coefficients from the despread data by utilizing FA (Finite Alphabet) properties of the signal, and outputs the result to demodulating section 904 and channel quality measuring section 905.

Demodulating section 904 demodulates the data from which complex coefficients are removed, and obtains transmitted data.

Channel quality measuring section 905 measures channel quality from the inputted data to generate and outputs the CSI to feedback section 906.

Feedback section 906 feeds back the inputted CSI as feedback information from antenna 901 using a feedback channel to the wireless communication apparatus at the transmitting side (FIG. 5).

The signal detection processing at the receiving side will be described below. In this embodiment, a reception algorithm in flat fading will be described as an example. The number of receiving antennas is assumed to be one, channel fading from two transmitting antennas of the base station to user k is shown as $h_1$ and $h_2$, and channel fading to user L is shown as $q_1$ and $q_2$.

In the n-th symbol period, user K receives N data for the user and removes N−2 data for the user by utilizing the orthogonality of the spreading codes. Therefore, signal $r_k(n)$ received by user K in the n-th symbol period is expressed by following equation 8. $r_k(n)$ is an N-dimensional vector.

[8]

$$r_k(n) = h_1(\alpha_k s_{k,2n-1} c + \alpha_k s_{k,2n} p) + h_2(\beta_k s_{k,2n-1} c + \beta_k s_{k,2n} p) + h_1(\alpha_1 s_{1,2n-1} c \alpha_1 s_{1,2n} p) + h_2(\beta_1 s_{1,2n-1} c + \beta_1 s_{1,2n} p) \quad \text{(Equation 8)}$$

Further, data obtained by performing despreading using spreading code c is expressed by following equation 9. $N_G$ is the length of the spreading code.

[9]

$$x_1(n) = N_G h_1(\alpha_k s_{k,2n-1}) + N_G h_2(\beta_k s_{k,2n-1}) + N_G h_1(\alpha_1 s_{1,2n-1}) + N_G h_2(\beta_1 s_{1,2n-1}) \quad \text{(Equation 9)}$$

As is clear from equation 9, data $x_1(n)$ shown in equation 9 obtained by despreading the received signal by user K includes a signal for user L. In this case, the signal for user L can be removed from the data of equation 9 using pre-codes $\alpha_L$ and $\beta_L$. $\alpha_L$ and $\beta_L$ are represented by equations 10 and 11, respectively.

(Equation 10)

$$\alpha_l = \frac{h_2}{\sqrt{h_1^2 + h_2^2}} \quad [10]$$

(Equation 11)

$$\beta_l = \frac{-h_1}{\sqrt{h_1^2 + h_2^2}} \quad [11]$$

By this means, $x_1(n)$ for user K from which the signal of user L is removed is obtained. $x_1(n)$ is expressed by equation 12.

[12]

$$x_1(n) = N(h_1 \alpha_K + h_2 \beta_K) s_{K,2n-1} \quad \text{(Equation 12)}$$

In the same way, by performing despreading using spreading code p and utilizing $\alpha_L$ and $\beta_L$, $x_2(n)$ for user K represented by following equation 13 can be obtained.

[13]

$$x_2(n) = N(h_1 \alpha_K + h_2 \beta_K) s_{K,2n} \quad \text{(Equation 13)}$$

Next, complex coefficients $h_1 \alpha_K + h_2 \beta_K$ in equations 12 and 13 cause phase offset upon demodulation and so need to be removed. User K does not know content of $\alpha_K$ and $\beta_K$ (that is, channel state of user L), and so complex coefficients are removed using FA properties of a communication signal.

On the other hand, for the other user L of the same group, the signal for user K can be removed from the received signal by utilizing $\alpha_K$ and $\beta_K$ using the same method.

A case has been described above as an example where the number of transmitting antennas is two and the number of receiving antennas is one. With the present invention, the number of transmitting antennas is not limited to two, and it is also possible to use multiple antennas.

Figure 9:
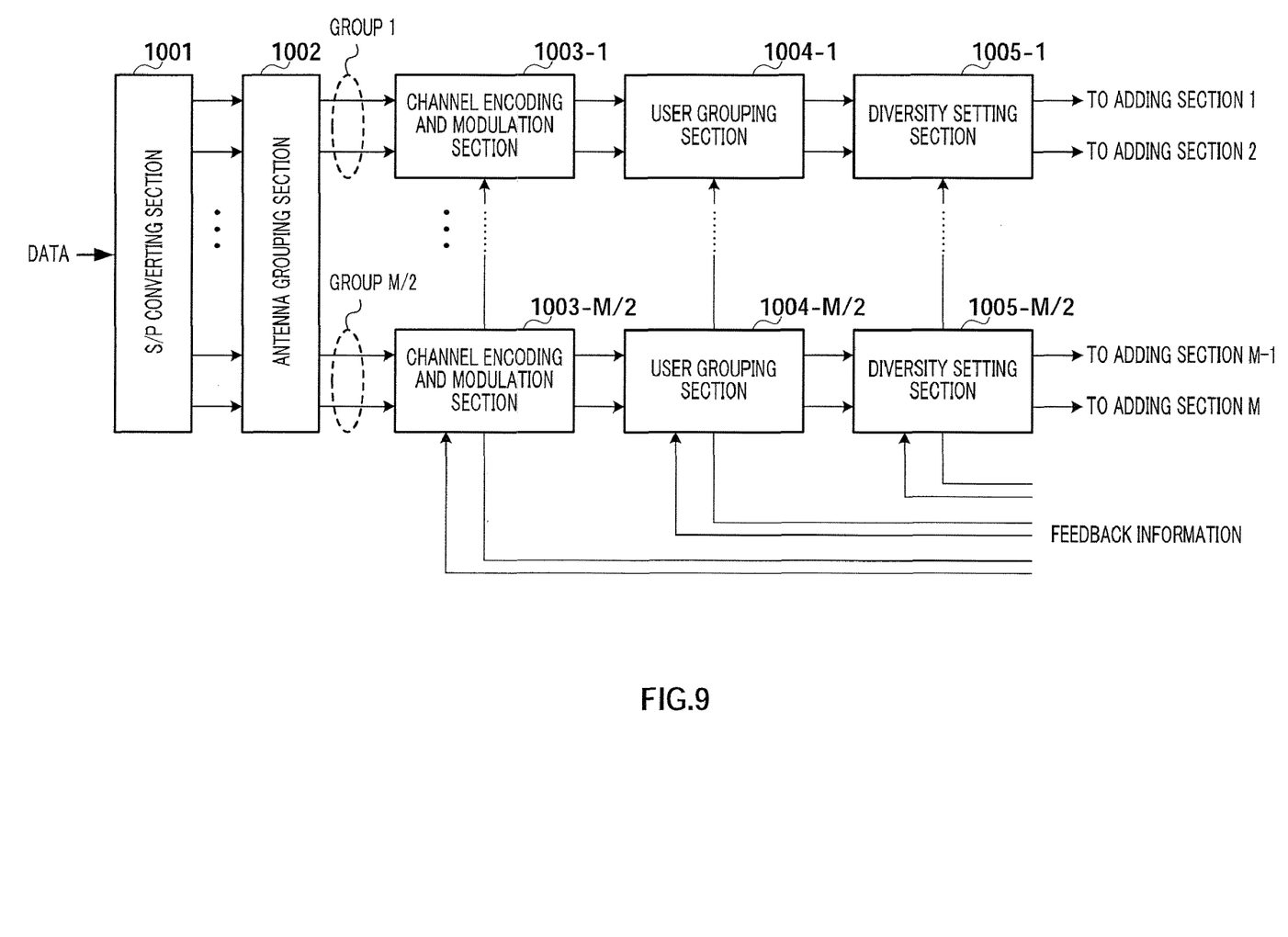
FIG. 9 shows a configuration for the case where the wireless communication apparatus according to the present invention uses multiple antennas.

FIG. 9 shows the configuration for the case where the wireless communication apparatus according to this embodiment uses multiple antennas. Here, the detailed explanations such as diversity settings are the same as described above, and so the explanations will be omitted.

In the wireless communication apparatus shown in

FIG. 9, S/P converting section 1001 converts the inputted data to parallel and outputs the result to antenna grouping section 1002.

Antenna grouping section 1002 groups two antennas into one group. Upon grouping, antenna grouping section 1002 groups two antennas which are relatively apart, into one group, taking into consideration performance of transmission space diversity, such that the two antennas which transmit the same signal do not cause deep fading at the same time. The optimum combinations of antennas include a combination that provides the lowest antenna channel fading correlation in a group and between groups based on the statistical data of antenna channel fading, while the base station and the user communicate.

Figure 10:
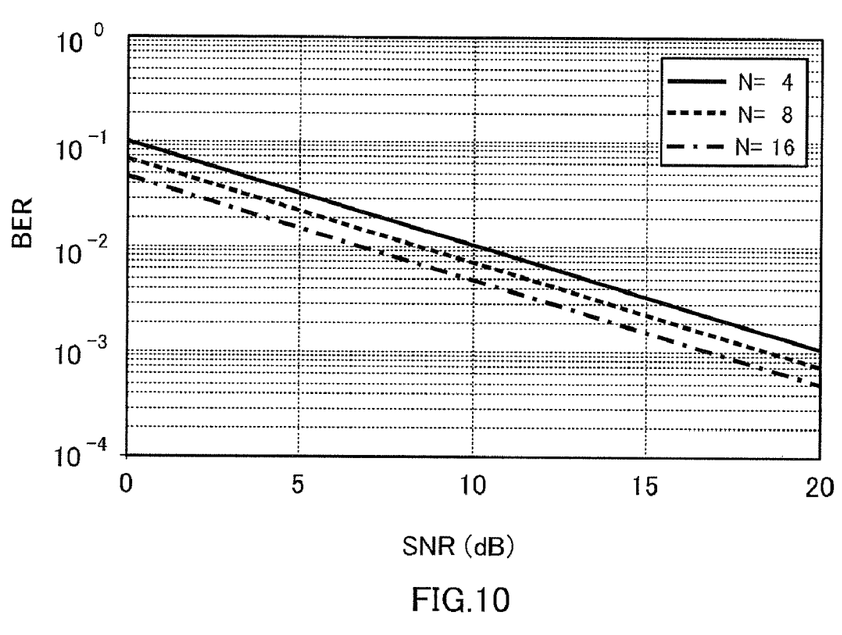
FIG. 10 is a graph showing different spreading gains in the wireless communication apparatus according to the embodiment of the present invention.
Figure 11:
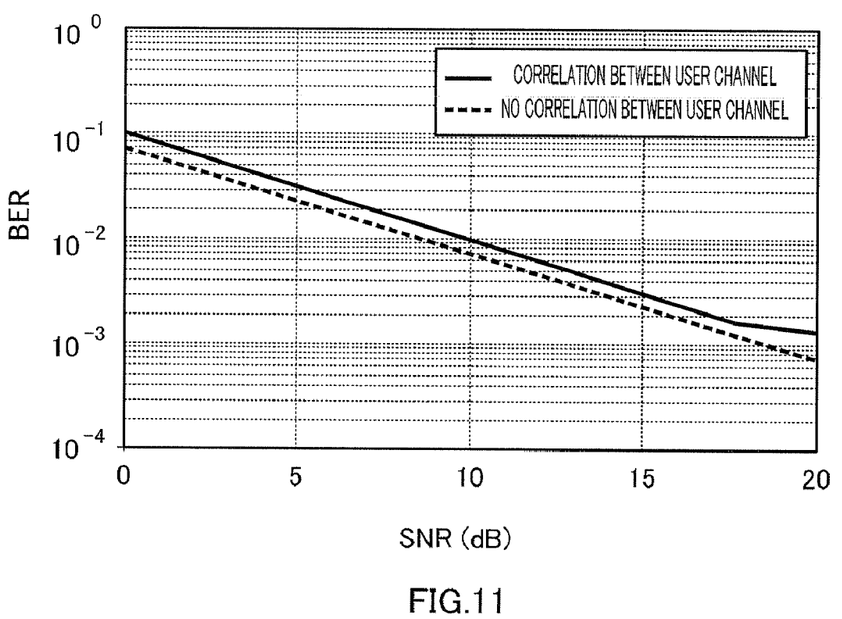
FIG. 11 is a graph showing channel correlation in the wireless communication apparatus according to the embodiment of the present invention.

FIG. 10 is a graph showing different spreading gains in the wireless communication apparatus according to the embodiment of the present invention. FIG. 11 is a graph showing channel correlation in the wireless communication apparatus according to the embodiment of the present invention. The environment for executing the simulation is provided based on experimental data of 300,000 times, and noise is zero average value Gaussian white noise and the energy is variable. Further, the number of transmitting antennas is two, the number of receiving antennas is one, and each channel fading from the transmitting antennas to the receiving antenna is not influenced by channel fading from the other.

FIG. 10 shows an SNR change curve when the number of users is two, and spreading gains are 4, 8 and 16 in a synchronized multi-user system. FIG. 11 shows a case where the spreading gain is 8, and compares changes of error rates using the SNR between the case where radio channels are correlated between two users and the case where the radio channels are separated between the two users. In FIG. 11, the upper curve is an error rate curve when channel correlation $\rho=0.5$. According to parameters relating to channel correlation in 3GPP SCM (3GPP TR 25.996, "Spatial channel model for multiple input multiple output simulation"), correlation between most base station diversity antennas is less than 0.5. From FIG. 11, performance for the case where channels are correlated is close to performance for the case where the channels are separated, and so it is obvious that the wireless communication apparatus according to the present invention is robust against the influence of correlation.

Compared to the MIMO communication apparatus employing the conventional MPD method and STTD spreading method, the wireless communication apparatus according to the embodiment of the present invention groups a plurality of users into a plurality of groups based on feedback information (CSI) taking into consideration all users collectively, and pre-encodes first and second transmission data using first and second pre-codes calculated from the CSI of the other user of the same group. Further, the wireless communication apparatus spreads the pre-encoded first and second transmission data using the distributed first and second spreading codes, adds up the obtained first and second spread data per pre-code, and transmits the result from the first and second antennas. In this way, the present invention can share channel resources between users taking into consideration users collectively. Further, by utilizing feedback information in the closed-loop system, it is possible to realize transmission space diversity without decreasing system throughput. Still further, by causing complicated equations such as simultaneous equations to be mainly performed at the transmitting side, it is possible to reduce complexity of signal detection processing at the receiving side.

Although the embodiment of the present invention has been described above, the preset invention can be implemented with various modifications, replacements and additions without departing from the scope of the present invention. Therefore, the present invention is not limited to the above-described embodiment, but limited by claims and the scope equivalent to them.

The present application is based on Chinese Patent Application No. 200510108559.7 filed on Sep. 30, 2005, the entire content of which is expressly incorporated by reference herein.

INDUSTRIAL APPLICABILITY

The wireless communication apparatus and wireless communication method according to the present invention are suitable for high-speed radio communication system employing various cellular schemes, wireless local area network system and the like having high throughput.

The invention claimed is:

1. A wireless communication apparatus used in a multi-input multi-output communication system, the apparatus comprising:
a user grouping section that groups a plurality of communication terminal users into a plurality of groups;
a calculating section that calculates a plurality of pre-codes from channel quality information fed back from one communication terminal user in one group;
an encoding section that encodes a plurality of data of an other communication terminal user in the one group using the plurality of pre-codes respectively to obtain a plurality of encoded data;
a spreading section that spreads the plurality of encoded data using a plurality of spreading codes which correspond to the plurality of data respectively, to obtain a plurality of spread data;
an adding section that adds up the plurality of spread data for each of the plurality of pre-codes to obtain a plurality of added data; and
a transmitting section that transmits the plurality of added data from a plurality of antennas, respectively.

2. The wireless communication apparatus according to claim 1, wherein:
the calculating section calculates a first pre-code and second pre-code from the channel quality information;
the encoding section multiplies first data and second data for the other communication terminal user by the first pre-code and the second pre-code, respectively, to obtain first encoded data where the first data is multiplied by the first pre-code, second encoded data where the first data is multiplied by the second pre-code, third encoded data where the second data is multiplied by the first pre-code and fourth encoded data where the second data is multiplied by the second pre-code;
the spreading section spreads the first encoded data and the second encoded data using a first spreading code corresponding to the first data to obtain first spread data and second spread data, and spreads the third encoded data and the fourth encoded data using a second spreading code corresponding to the second data to obtain third spread data and fourth spread data;
the adding section adds the first spread data and the third spread data, which are multiplied by the first pre-code, to obtain first added data, and adds the second spread data and the fourth spread data, which are multiplied by the second pre-code, to obtain second added data; and
the transmitting section transmits the first added data from a first antenna and transmits the second added data from a second antenna.

3. The wireless communication apparatus according to claim 1, wherein the user grouping section determines a number of communication terminal users per group based on a number of antennas and diversity gain.

4. The wireless communication apparatus according to claim 1, wherein the user grouping section groups a plurality of communication terminal users having lowest correlation between the communication terminal users, in one group.

5. The wireless communication apparatus according to claim 4, wherein the user grouping section calculates the correlation from the channel quality information.

6. The wireless communication apparatus according to claim 1, wherein the spreading section uses spreading codes that vary for each group.

7. The wireless communication apparatus according to claim 1, further comprising an antenna grouping section that groups the plurality of antennas into one group.

8. A wireless communication method used in a multi-input multi-output communication system, the method comprising the steps of:

grouping a plurality of communication terminal users into a plurality of groups;

calculating a plurality of pre-codes from channel quality information fed back from one communication terminal user in one group;

encoding a plurality of data of an other communication terminal user in the one group using the plurality of pre-codes respectively to obtain a plurality of encoded data;

spreading the plurality of encoded data using a plurality of spreading codes which correspond to the plurality of data respectively, to obtain a plurality of spread data;

adding up the plurality of spread data for each of the plurality of pre-codes to obtain a plurality of added data; and transmitting the plurality of added data from a plurality of antennas.

* * * * *